(12) United States Patent
Qiu et al.

(10) Patent No.: US 7,291,688 B2
(45) Date of Patent: Nov. 6, 2007

(54) FLUOROACRYLATE-MERCAPTOFUNCTIONAL COPOLYMERS

(75) Inventors: Zai-Ming Qiu, Woodbury, MN (US); John C. Clark, White Bear Lake, MN (US); Ramesh C. Kumar, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/027,605

(22) Filed: Dec. 28, 2004

(65) Prior Publication Data

US 2006/0142518 A1 Jun. 29, 2006

(51) Int. Cl.
*C08F 12/20* (2006.01)
*C08G 75/04* (2006.01)

(52) U.S. Cl. ............... 526/242; 526/286; 526/319; 528/70; 528/374

(58) Field of Classification Search ................. 526/242, 526/286, 319; 528/374, 70
See application file for complete search history.

(56) References Cited

U.S. PATENT DOCUMENTS

| | | | |
|---|---|---|---|
| 2,803,615 A | 8/1957 | Ahlbrecht | |
| 3,011,988 A | 12/1961 | Luedke et al. | |
| 3,278,352 A | 10/1966 | Erickson | |
| 3,282,905 A | 11/1966 | Fasick et al. | |
| 3,318,852 A | 5/1967 | Dixon | |
| 3,378,609 A | 4/1968 | Fasick et al. | |
| 3,398,182 A | 8/1968 | Guenthner et al. | |
| 3,413,226 A | 11/1968 | Coleman | |
| 3,455,889 A | 7/1969 | Coleman | |
| 3,458,391 A | 7/1969 | Miller, Jr. | |
| 3,459,834 A | 8/1969 | Schmitt | |
| 3,787,351 A | 1/1974 | Olson | |
| 4,321,404 A | 3/1982 | Williams et al. | |
| 4,366,300 A | 12/1982 | Delescluse | |
| 4,513,059 A | 4/1985 | Dabroski | |
| 4,778,915 A | 10/1988 | Lina et al. | |
| 4,792,444 A | 12/1988 | Fukasawa et al. | |
| 4,920,190 A | 4/1990 | Lina et al. | |
| 5,032,460 A * | 7/1991 | Kantner et al. ............. 428/447 |
| 5,093,398 A | 3/1992 | Rottger et al. | |
| 5,115,059 A | 5/1992 | Le | |
| 5,144,056 A | 9/1992 | Lina et al. | |
| 5,173,547 A | 12/1992 | Rottger et al. | |
| 5,446,118 A | 8/1995 | Shen et al. | |
| 5,646,222 A | 7/1997 | Maekawa et al. | |
| 5,688,884 A | 11/1997 | Baker et al. | |
| 5,723,630 A | 3/1998 | Cheburkov et al. | |
| 5,725,789 A | 3/1998 | Huber et al. | |
| 5,872,180 A | 2/1999 | Michels et al. | |
| 5,883,175 A | 3/1999 | Kubo et al. | |
| 6,001,923 A | 12/1999 | Moncur et al. | |
| 6,048,952 A | 4/2000 | Behr et al. | |
| 6,114,045 A | 9/2000 | Juhue et al. | |
| 6,121,143 A | 9/2000 | Messner et al. | |
| 6,197,378 B1 | 3/2001 | Clark et al. | |
| 6,238,798 B1 | 5/2001 | Kang et al. | |
| 6,265,060 B1 | 7/2001 | Arudi et al. | |
| 6,482,911 B1 | 11/2002 | Jariwala et al. | |
| 6,500,439 B1 | 12/2002 | Morita et al. | |
| 6,569,521 B1 | 5/2003 | Sheridan et al. | |
| 6,664,354 B2 | 12/2003 | Savu et al. | |
| 6,803,109 B2 * | 10/2004 | Qiu et al. ................. 428/423.1 |
| 6,890,360 B2 | 5/2005 | Cote et al. | |
| 6,894,106 B2 | 5/2005 | Aga et al. | |
| 6,939,580 B2 | 9/2005 | Enomoto et al. | |
| 2001/0005738 A1 | 6/2001 | Bruchmann et al. | |
| 2003/0001130 A1 | 1/2003 | Qiu | |
| 2003/0026997 A1 | 2/2003 | Qiu et al. | |
| 2003/0083448 A1 | 5/2003 | Fan et al. | |

(Continued)

FOREIGN PATENT DOCUMENTS

EP 0 712 046 A1 5/1996

(Continued)

OTHER PUBLICATIONS

G. Oertel, Polyurethane Handbook, (1993), 2$^{nd}$ Edition, Hanser/Gardner Publications, Inc., Cincinnati, OH.

(Continued)

*Primary Examiner*—David W. Wu
*Assistant Examiner*—M. Bernshteyn
(74) *Attorney, Agent, or Firm*—Lisa P. Fulton

(57) ABSTRACT

A copolymer comprises repeating units derived from at least one co-reactant comprising two or more mercapto functional groups, and repeating units derived from a fluoroacrylate comprising the reaction product of:
(a) at least one fluorochemical alcohol represented by the formula:

$$C_4F_9\text{—}X\text{—}OH$$

wherein:

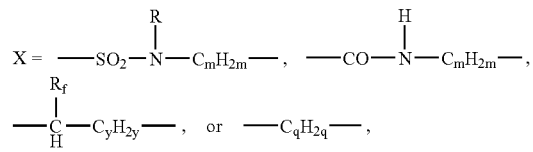

R=hydrogen or an alkyl group of 1 to 4 carbon atoms,
m=2 to 8,
$R_f=C_nF_{2n+1}$,
n=1 to 5,
y=0 to 6, and
q=1 to 8;
(b) at least one unbranched symmetric diisocyanate; and
(c) at least one hydroxy-terminated alkyl (meth)acrylate or 2-fluoroacrylate monomer having 2 to about 30 carbon atoms in its alkylene portion.

19 Claims, No Drawings

U.S. PATENT DOCUMENTS

| | | |
|---|---|---|
| 2003/0130457 A1 | 7/2003 | Maekawa et al. |
| 2004/0147188 A1* | 7/2004 | Johnson et al. ............ 442/93 |
| 2005/0106326 A1 | 5/2005 | Audenaert et al. |
| 2005/0137289 A1 | 6/2005 | Hooftman et al. |
| 2005/0143541 A1 | 6/2005 | Caldwell et al. |
| 2005/0143595 A1 | 6/2005 | Klun et al. |

FOREIGN PATENT DOCUMENTS

| | | |
|---|---|---|
| EP | 0 849 392 A2 | 6/1998 |
| EP | 1 225 187 A1 | 7/2002 |
| EP | 1 225 188 A1 | 7/2002 |
| EP | 1 329 548 A1 | 7/2003 |
| EP | 1 380 628 A1 | 1/2004 |
| FR | 1.468.301 | 12/1966 |
| GB | 870022 | 6/1961 |
| GB | 1 120 304 | 7/1968 |
| JP | 61-148208 | 7/1986 |
| WO | WO97/14842 A1 | 4/1997 |
| WO | WO 01/30873 A1 | 5/2001 |
| WO | WO 03/048224 A1 | 6/2003 |
| WO | WO 03/062521 A1 | 7/2003 |
| WO | WO 2005/065164 A2 | 7/2005 |
| WO | WO 2005/066224 A1 | 7/2005 |

OTHER PUBLICATIONS

U.S. Appl. No. 11/027,633, filed Dec. 28, 2004, entitled "Water- and Oil-Repellent Fluorourethanes and Fluoroureas".

U.S. Appl. No. 11/027,612, filed Dec. 28, 2004, entitled "Fluoroacrylate-Multifunctional Acrylate Copolymer Compositions".

U.S. Appl. No. 11/027,606, filed Dec. 28, 2004, entitled "Water-Based Release Coating Containing Fluorochemical".

U.S. Appl. No. 11/027,602, filed Dec. 28, 2004, entitled "Fluorochemical Containing Low Adhesion Backsize".

* cited by examiner

FLUOROACRYLATE-MERCAPTOFUNCTIONAL COPOLYMERS

FIELD

This invention relates to fluoroacrylate-mercaptofunctional copolymers.

BACKGROUND

Various fluorinated acrylic resins containing urethane linkages are known to have oil and water repellency properties (see, for example, U.S. Pat. No. 4,321,404 (Williams et al.), U.S. Pat. No. 4,778,915 (Lina et al.), U.S. Pat. No. 4,920,190 (Lina et al.), U.S. Pat. No. 5,144,056 (Anton et al.), and U.S. Pat. No. 5,446,118 (Shen et al.)). These resins can be polymerized and applied as coatings to substrates such as, for example, textiles, carpets, wall coverings, leather, and the like to impart water- and oil repellency.

Typically, these resins comprise long chain pendant perfluorinated groups (for example, 8 carbon atoms or greater) because long chains readily align parallel to adjacent pendant groups attached to acrylic backbone units, and thus maximize water- and oil-repellency. However, long chain perfluorinated group-containing compounds such as, for example, perfluorooctyl containing compounds may bioaccumulate in living organisms (see, for example, U.S. Pat. No. 5,688,884 (Baker et al.)).

SUMMARY

In view of the foregoing, we recognize that there is a need for water- and oil-repellent acrylic polymers that are less bioaccumulative. In addition, we recognize that for some applications the flexibility provided by graft and block copolymers can be an advantage.

Briefly, in one aspect, the present invention provides water- and oil-repellent fluoroacrylate-mercaptofunctional copolymers that have four carbon chain perfluorinated groups, which are believed to be less toxic and less bioaccumulative than longer chain perfluorinated groups (see, for example, WO 01/30873). The copolymers of the invention comprise repeating units derived from at least one co-reactant comprising two or more mercapto functional groups, and repeating units derived from a fluoroacrylate comprising the reaction product of:

(a) at least one fluorochemical alcohol represented by the formula:

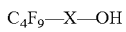

wherein:

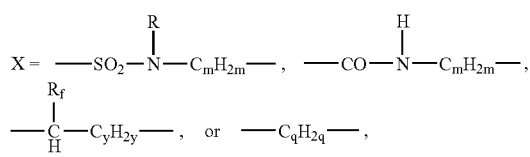

R=hydrogen or an alkyl group of 1 to 4 carbon atoms,
m=2 to 8,
$R_f=C_nF_{2n+1}$,
n=1 to 5,
y=0 to 6, and
q=1 to 8;

(b) at least one unbranched symmetric diisocyanate; and
(c) at least one hydroxy-terminated alkyl (meth)acrylate or 2-fluoroacrylate monomer having 2 to about 30 carbon atoms in its alkylene portion.

As used herein, a "co-reactant comprising two or more mercapto functional groups" refers to multithiols (for, example, dithiols, trithiols, etc.), or organic compounds resembling polyols but having the oxygens of the hydroxyl groups replaced by sulfurs. The term "(meth)acrylate" refers to both acrylates and methacrylates.

It has been discovered that the copolymers of the invention exhibit good water- and oil-repellency properties. In light of the prior art, one would expect that copolymers comprising fluoroacrylates derived from shorter perfluorinated chains would not be as effective at imparting water- and oil-repellency as those derived from longer perfluorinated chains (see, for example, U.S. Pat. No. 2,803,615 (Ahlbrecht et al.) and U.S. Pat. No. 3,787,351 (Olson)). Surprisingly, however, the fluoroacrylate-mercaptofunctional copolymers of the invention exhibit water- and oil-repellency comparable to fluoroacrylates with longer perfluorinated chains.

The fluoroacrylate-mercaptofunctional copolymers of the invention therefore meet the need in the art for polymerizable water- and oil-repellent acrylic resins that are less bioaccumulative.

In addition, the fluoroacrylate-mercaptofunctional copolymers of the invention provide the flexibility of block and graft copolymers, which combine the properties of two dissimilar polymers. Such copolymers find use in applications that require a combination of the unique properties of the fluoroacrylate with those of various mercaptofunctional polymers.

DETAILED DESCRIPTION

Fluoroacrylates useful in the invention are the reaction product of a fluorochemical alcohol, at least one unbranched symmetric diisocyanate, and at least one hydroxy-terminated alkyl (meth)acrylate or 2-fluoroacrylate monomer.

Useful fluorochemical alcohols can be represented by the formula:

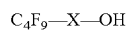

wherein:

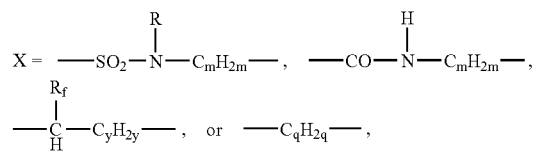

R=hydrogen or an alkyl group of 1 to 4 carbon atoms,
m=2 to 8,
$R_f=C_nF_{2n+1}$,
n=1 to 5,
y=0 to 6, and
q=1 to 8.

Representative examples of suitable alcohols include $C_4F_9SO_2NH(CH_2)_2OH$, $C_4F_9SO_2NCH_3(CH_2)_2OH$, $C_4F_9SO_2NCH_3(CH_2)_4OH$, $C_4F_9SO_2NC_2H_5(CH_2)_6OH$, $C_4F_9(CH_2)_4OH$, $C_4F_9CONH(CH_2)_4OH$, $C_4F_9SO_2NCH_3(CH_2)_3OH$, $C_4F_9SO_2NH(CH_2)_6OH$, $C_4F_9CH_2OH$, $C_4F_9CONH(CH_2)_8OH$, $C_4F_9(CH_2)_2OH$, $C_4F_9SO_2NCH_3$ $(CH_2)_2OH$, $C_4F_9CONH(CH_2)_2OH$, $C_4F_9SO_2NCH_3(CH_2)_6OH$, $C_4F_9SO_2NH(CH_2)_7OH$, $C_4F_9SO_2NC_3H_7(CH_2)_2OH$, $C_4F_9SO_2NC_4H_9(CH_2)_2OH$, $C_4F_9CONH(CH_2)_2OH$, and $C_4F_9(CH_2)_4OH$.

Preferably, m is 2 to 4. Preferably, q is 2.

Preferably, X is

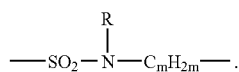

More preferably, X is

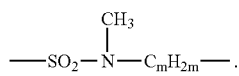

Most preferably, X is selected from the group consisting of

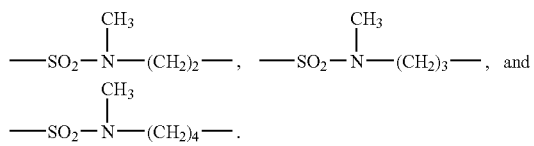

Preferred fluorochemical alcohols include, for example, $C_4F_9SO_2NCH_3(CH_2)_2OH$, $C_4F_9SO_2NCH_3(CH_2)_4OH$, and $C_4F_9(CH_2)_2OH$. A more preferred fluorochemical alcohol is $C_4F_9SO_2NCH_3(CH_2)_2OH$.

Symmetric diisocyanates are diisocyanates that meet the three elements of symmetry as defined by *Hawley's Condensed Chemical Dictionary* 1067 (1997). First, they have a center of symmetry, around which the constituent atoms are located in an ordered arrangement. There is only one such center in the molecule, which may or may not be an atom. Second, they have a plane of symmetry, which divides the molecule into mirror-image segments. Third, they have axes of symmetry, which can be represented by lines passing through the center of symmetry. If the molecule is rotated, it will have the same position in space more than once in a complete 360° turn.

As used herein, the term "unbranched" means that the symmetric diisocyanate does not contain any subordinate chains of one or more carbon atoms.

Representative examples of unbranched symmetric diisocyanates include 4,4'-diphenylmethane diisocyanate (MDI), 1,6-hexamethylene diisocyanate (HDI), 1,4-phenylene diisocyanate (PDI), 1,4-butane diisocyanate (BDI), 1,8-octane diisocyanate (ODI), 1,12-dodecane diisocyanate, and 1,4-xylylene diisocyanate (XDI). Preferably, unbranched symmetric diisocyanates are aromatic.

Preferred unbranched symmetric diisocyanates include, for example, MDI, HDI, and PDI. A more preferred unbranched symmetric diisocyanate is MDI. In its pure form, MDI is commercially available as Isonate™ 125M from Dow Chemical Company (Midland, Mich.), and as Mondur™ from Bayer Polymers (Pittsburgh, Pa.).

Hydroxy-terminated alkyl (meth)acrylate and 2-fluoroacrylate monomers that are useful in the fluoroacrylates of the invention can have from 2 to about 30 carbon atoms (preferably, from 2 to about 12 carbon atoms) in their alkylene portion.

Preferably, the hydroxy-terminated alkyl (meth)acrylate monomer is a hydroxy-terminated alkyl acrylate. Preferred hydroxy-terminated alkyl acrylates include, for example, hydroxy ethyl acrylate, hydroxy butyl acrylate, hydroxy hexyl acrylate, hydroxy decyl acrylate, hydroxy dodecyl acrylate, and mixtures thereof.

The fluoroacrylates useful in the invention can be prepared, for example, by first combining the fluorochemical alcohol and unbranched symmetric diisocyanate in a solvent, and then adding the hydroxy-terminated alkyl (meth)acrylate. Useful solvents include esters (for example, ethyl acetate), ketones (for example, methyl ethyl ketone), ethers (for example, methyl-tert-butyl ether), and aromatic solvents (for example, toluene).

Preferably, the reaction mixture is agitated. The reaction can generally be carried out at a temperature between room temperature and about 120° C. (preferably, between about 50° C. and about 70° C.).

Typically the reaction is carried out in the presence of a catalyst. Useful catalysts include bases (for example, tertiary amines, alkoxides, and carboxylates), metal salts and chelates, organometallic compounds, acids and urethanes. Preferably, the catalyst is an organotin compound (for example, dibutyltin dilaurate (DBTDL) or a tertiary amine (for example, diazobicyclo[2.2.2]octane (DABCO)), or a combination thereof. More preferably, the catalyst is DBTDL.

When fluorochemical alcohols represented by the formula $C_4F_9SO_2NCH_3(CH_2)_mOH$, wherein m=2 to 4, are reacted with MDI, the process described in U.S. patent application Ser. No. 10/751,142, entitled "Process For Preparing Fluorochemical Monoisocyanates," filed on Dec. 31, 2003, can be used.

Fluoroacrylates useful in the compositions of the invention can be represented by the following general formula:

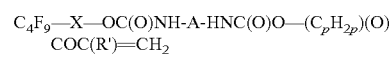

wherein:

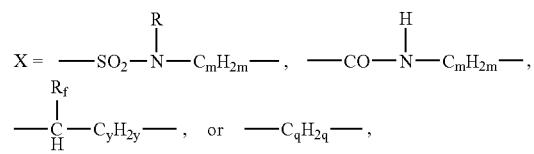

R=H or an alkyl group of 1 to 4 carbon atoms,
m=2 to 8,
$R_f=C_nF_{2n+1}$,
n=1 to 5,
y=0 to 6,
q=1 to 8,
A=an unbranched symmetric alkylene group, arylene group, or aralkylene group,
p=2 to 30, and
R'=H, $CH_3$, or F.
Preferably, q is 2.
Preferably, X is

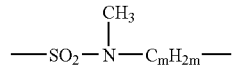

and m is 2 to 4.

Preferably, A is selected from the group consisting of $C_6H_{12}$,

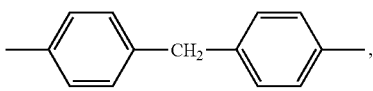

and

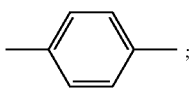

more preferably, A is

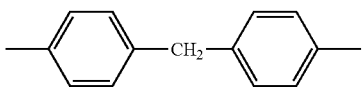

Preferably, p is 2 to 12; more preferably, p is selected from the group consisting of 2, 4, 6, 10, and 12; most preferably, p is 2.

Preferably, R' is H.

The fluoroacrylates described above can be reacted with co-reactants comprising two or more mercapto functional groups to form the water- and oil-repellent fluoroacrylate-mercaptofunctional copolymers of the invention.

Suitable co-reactants include, for example, multimercaptans represented by the formula:

$$(B)_n(Q\text{-}SH)_k$$

wherein:

B=a multivalent segment selected from the group consisting of

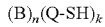

$-(CH_2)_b-$, $-(CH_2CH_2O)_b-$, $-(CHCH_3CH_2O)_b-$, $-(CH_2CH_2O)_b-(CHCH_3CH_2O)_b-$, $-C_4H_8(OC_4H_8)_b-$, $-C_2H_4OC_2H_4OC_2H_4-$, $C_6H_5CR''_2C_6H_5-$, and $-(C_2H_4O)_bC_6H_5CR''_2C_6H_5(OC_2H_4)_b-$;

b=1 to 100;

R''=$CH_3$, $CF_3$, or H;

Q=$-(CH_2)_b-$, $-C(O)(CH_2)_a-$, or $-OC(O)(CH_2)_a-$;

a=1 to 10;

n=1 or greater; and k=2 or greater.

Other suitable co-reactants include, for example, dimercaptans represented by the formula:

$$HS(Q'\text{-}(B')_n\text{-}Q'S)_bH$$

wherein:

B'=a multivalent segment selected from the group consisting of $-(CH_2)_b-$, $-(CH_2CH_2O)_b-$, $-(CHCH_3CH_2O)_b-$, $-(CH_2CH_2O)_b-$ $(CHCH_3CH_2O)_b-$, $-C_4H_8(OC_4H_8)_b-$, $-C_2H_4OC_2H_4OC_2H_4-$, $C_6H_5CR''_2C_6H_5-$, and $-(C_2H_4O)_bC_6H_5CR''_2C_6H_5(OC_2H_4)_b-$;

b=1 to 100;

R''=$CH_3$, $CF_3$, or H;

n=1 or greater; and

Q'=$-OC(O)CH_2CH_2-$ or $-C(O)CH_2CH_2-$.

These dimercaptans can be prepared, for example, by reacting di(meth)acrylates with disulfhydryl group-containing reactants (for example, hydrogen sulfide, 1,4-butanedithiol, 2-hydroxy-propane-1,3-dithiol, 2,2-dithiol-diethyl ether, 3,3-dimercaptodipropyl sulfone, diethylene glycol-bis-thioglycolate, and the like) as described in U.S. Pat. No. 3,278,352 (Erickson et al.).

Still other suitable co-reactants include, for example, fluorinated dimercaptans represented by the formula:

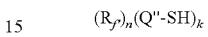

wherein:

$R_f$=a multivalent segment comprising a fluorinated alkyl or alkylene group (for example, $-C_2H_4N(SO_2C_4F_9)C_2H_4-$, $-(CF_2)_d-$, $-(CF_2CF_2O)_e(CF_2O)_fCF_2-$);

d=2 to 10;

e=2 to 30;

f=1 to 30;

Q''=$-C(O)NH(CH_2)_b-$ or $-OC(O)(CH_2)_b-$;

b=2 to 12;

n=1 or greater; and k=2 or greater.

Preferred fluorinated dimercaptans include, for example, $C_4F_9SO_2N(C_2H_4OC(O)CH_2SH)_2$, $HSC_2H_4NHC(O)(CF_2)_4C(O)NHC_2H_4SH$, and $HSC_2H_4NHC(O)CF_2(OC_2F_4)e(OCF_2)_fC(O)NHC_2H_4SH$.

These fluorinated dimercaptans can be prepared, for example, from the corresponding fluorinated diols and $HS(CH_2)_bCO_2H$ as described in GB 1120304, or from a fluorinated dimethyl ester and $NH_2C_2H_4SH$.

Still more suitable co-reactants include, for example, mercapto functional silicone compounds such as those represented by the following formula:

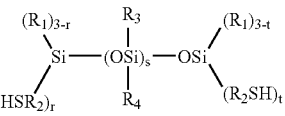

wherein:

$R_1$=monovalent moieties which can independently be the same or different and are selected from the group consisting of alkyl, aryl, alkaryl, alkoxy, alkylamino, hydroxyl, hydrogen, and fluoroalkyl;

$R_2$=divalent linking groups which can independently be the same or different;

$R_3$=monovalent moieties which can independently be the same or different and are selected from the group consisting of alkyl, aryl, alkaryl, alkoxy, alkylamino, hydroxyl, hydrogen, fluoroalkyl, and -ZSH;

$R_4$=monovalent moieties which can independently be the same or different and are selected from the group consisting of alkyl, aryl, alkaryl, alkoxy, alkylamino, hydroxyl, hydrogen, fluoroalkyl, and -ZSH;

wherein:

Z=a divalent linking group;

r=0 to 3;

s=10 or greater; and t=0 to 3;

wherein at least two of the following are true:
t=at least 1
r=at least 1
$R_3$ comprises at least one -ZSH moiety; and
$R_4$ comprises at least one -ZSH moiety.

Mercapto functional silicone compounds such as those described above can be prepared, for example, as described in U.S. Pat. No. 5,032,460 (Kantner et al.).

A preferred mercapto functional silicone compound is the mercapto functional dimethyl siloxane available as KF-2001 from Shin-Etsu, Japan.

Many useful co-reactants are commercially available. Commercially available co-reactants include, for example, 2,2'-oxydiethanethiol, 1,2-ethanethiol, 2-mercaptoethane sulfide, 3,7-dithia-1,9-nonanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 3,6-dioxa-1,8-octanedithiol, 1,10-decanedithiol, 1,12-dimercaptododecane, ethylene glycol bis(3-mercaptopropionate), 1,4-butanediol bis(3-mercaptopropionate), 1,1,1-trimethylolpropane tris-(3-mercaptopropionate), pentaerythritol tetra(3-mercaptopropionate), trimethylolpropane tris(3-mercaptopropionate), and tris[2-(3-mercaptopropionyloxy)ethyl]isocyanurate.

The fluoroacrylate-mercaptofunctional copolymers of the invention can be prepared, for example, by combining the fluoroacrylates and the co-reactants comprising two or more mercapto functional groups in a solvent. Useful reaction solvents include esters (for example, ethyl acetate), ketones (for example, methyl ethyl ketone), ethers (for example, methyl-tert-butyl ether), amides (for example, dimethyl formamide), and alcohols.

Preferably, the reaction mixture is agitated. The reaction can generally be carried out at a temperature between about room temperature and about 120° C. (preferably, between about 50° C. and about 70° C.).

The reaction is carried out using an initiator. Useful initiators include, for example, substituted azonitrile compounds, peroxides, peracids, and peresters. Specific examples of useful initiators include 2,2-azo-bis-(isobutyronitrile), dimethyl 2,2'-azo-bis-isobutyrate, azo-bis-(diphenylmethane), 4-4'-azo-bis(4-cyanopentanoic) acid, 1,1'azobis-(cyclohexane carbonitrile), 2,2'-azo-bis-(2-methyl butyronitrile), 2,2'-azo-bis-(2,4-dimethyl valeronitrile), azo-bis-dimethyl valeronitrile,4,4'-azo-bis-(4-cyanovaleric acid), benzoyl peroxide, cumyl peroxide, tert-butyl peroxide, cyclohexanone peroxide, glutaric acid peroxide, lauroyl peroxide, methyl ethyl ketone peroxide, hydrogen peroxide, hydroperoxides such as tert butyl hydroperoxide and cumene hydroperoxide, peracetic acid, perbenzoic acid, diisopropyl percarbonate, and the like.

The copolymers of the invention can include repeating units derived from one or more comonomers or functionalized comonomers in order to modify their properties and performance for different applications.

Comonomers such as, for example, alkyl acrylates can improve durability and film-forming properties. Representative examples of useful comonomers include methyl (meth)acrylate, butyl acrylate, isobutyl (meth)acrylate, hexyl acrylate, dodecyl acrylate, and octadecyl acrylate.

Other comonomers can modify properties such as, for example, adhesion, hydrophilicity, reactivity, or glass transition temperature. Groups that are useful in comonomers include, for example, hydroxy, carboxy, quaternary ammonium, acetate, pyrrolidine, polyethylene glycol, sulfonic acid, trialkoxysilane, and silicone. Useful comonomers include, for example, hydroxy ethyl acrylate, hydroxy butyl acrylate, hydroxy hexyl acrylate, hydroxy decyl acrylate, hydroxy dodecyl acrylate, acrylic acid, methacrylic acid, N-vinyl 2-pyrrolidinone, hydroxypropyl acrylic acid, diacetone acrylamide, poly(ethylene glycol) methylethyl ether, ethylene glycol methacrylate phosphate, 2-methacryloxypropyltrimethoxysilane, 3-methacryloxypropyltriethoxysilane, 3-acryloxypropyltrimethoxysilane, 3-methacryloxypropyltrichlorosilane, glycidyl methacrylate, glycidyl acrylate, N-methylol methacrylamide, and N-methylol acrylamide.

Copolymers of the invention can be used in coating compositions to impart water- and oil-repellency to a wide variety of substrates. The coating compositions comprise a copolymer of the invention and a solvent (for example, water and/or an organic solvent). When the solvent is water, the coating composition typically further comprises a surfactant.

The fluoroacrylate-mercaptofunctional copolymers of the invention can be dissolved, suspended, or dispersed in a wide variety of solvents to form coating compositions suitable for coating onto a substrate. The coating compositions can generally contain from about 0.1 about 10 percent fluoroacrylate-mercaptofunctional copolymer (preferably about 1 to about 5 percent), based on the weight of the coating composition.

The coating compositions can be applied to a wide variety of substrates such as, for example, fibrous substrates and hard substrates. Fibrous substrates include, for example, woven, knit, and non-woven fabrics, textiles, carpets, leather, and paper. Hard substrates include, for example, glass, ceramic, masonry, concrete, natural stone, man-made stone, grout, metals, wood, plastics, and painted surfaces.

The coating compositions can be applied to a substrate (or articles comprising a substrate) by standard methods such as, for example, spraying, padding, dipping, roll coating, brushing, or exhaustion. Optionally, the composition can be dried to remove any remaining water or solvent.

Fluoroacrylate-mercaptofunctional copolymers of the invention can be used in release coatings. Comonomers that are useful in release coatings include, for example, octadecyl acrylate, N-vinyl 2-pyrollidinone, methacryloxy propyl dimethyl siloxane, acrylic acid, methacrylic acid, acrylonitrile and methyl acrylate. The release coating compositions may or may not require a curing step after coating on a substrate.

Coating compositions useful for release coatings can be applied to surfaces requiring release properties from adhesives. Substrates suitable for release coatings include, for example, paper, metal sheets, foils, non-woven fabrics, and films of thermoplastic resins such as polyesters, polyamides, polyolefins, polycarbonates, and polyvinyl chloride.

Release coating compositions can be applied to suitable substrates by conventional coating techniques such as, for example, wire-wound rod, direct gravure, offset gravure, reverse roll, air-knife, and trailing blade coating. The resulting release coating compositions can provide effective release for a wide variety of pressure sensitive adhesives such as, for example, natural rubber based adhesives, silicone based adhesives, acrylic adhesives, and other synthetic film-forming elastomeric adhesives.

EXAMPLES

Objects and advantages of this invention are further illustrated by the following examples, but the particular materials and amounts thereof recited in these examples, as well as other conditions and details, should not be construed to unduly limit this invention.

| Designator | Name, Formula and/or Structure | Availability |
|---|---|---|
| PEG-900 | Polyethylene glycol $HO(C_2H_4O)_nH$, Mn ca. 900 | Sigma Aldrich, Milwaukee, WI |
| Carbowax-1450 | Polyethylene glycol $HO(C_2H_4O)_nH$, Mn ca. 1450 | Acros Organics U.S.A. Morris Plains, NJ |
| MCAA | Mercaptoacetic acid $HSCH_2CO_2H$ | Sigma Aldrich, |
| TFMSA | Trifluoromethanesulfonic Acid $CF_3SO_3H$ | Sigma Aldrich, |
| HEMAPA | 2-(Methacryloyloxy)ethyl phosphate $CH_2=CMeCO_2CH_2CH_2OP(O)(OH)_2$ | Sigma Aldrich, |
| DOODS | 3,6-dioxa-1,8-octanedithiol $HSC_2H_4OC_2H_4OC_2H_4SH$ | Sigma Aldrich, |
| C10DO | 1,10-Decanediol $HO(CH_2)_{10}OH$ | Sigma Aldrich, |
| KF-2001 | Copolymer of (mercaptopropyl)methylsiloxane and dimethylsiloxane (MW~8,000/4-SH) $-[SiMe_2O]_x-[SiMe(C_3H_6SH)O]_y-$ | Shin-Etsu Japan |
| AA | Acrylic acid | Sigma Aldrich |
| VAZO-67 | 2,2'-azobis(2-cyanopentane) | DuPont, Wilmington, DE |
| MDI | 4,4'-methylenebis(phenyl isocyanate); OCN—C$_6$H$_4$—CH$_2$—C$_6$H$_4$—NCO | Sigma-Aldrich |
| EtOAc | Ethyl acetate $CH_3CO_2CH_2CH_3$ | Sigma-Aldrich |
| HEA | 2-Hydroxyethyl acrylate; $HOCH_2CH_2OC(O)CH=CH_2$ | Sigma-Aldrich |
| DMF | N,N-Dimethylformamide $HC(O)NMe_2$ | Sigma-Aldrich |
| EGDS | Ethylene Glycol Bisthioglycolate $HSCH_2CO_2CH_2CH_2OC(O)CH_2SH$ | Sigma Aldrich, |
| LTMDME | Perfluoropolyether dimethyl ester $CH_3OC(O)CF_2(OC_2F_4)_n(OCF_2)_mCO_2CH_3$ | Solvay Solexis, Inc. Italy |
| CSA | Cysteamine $NH_2CH_2CH_2SH$ | Fluka Chemical Milwaukee, WI |
| ODA | Octadecyl acrylate $CH_2=CHCO_2(CH_2)_{17}CH_3$ | Sigma Aldrich |
| MeOPEGA | Methoxy-polyethylene glycol monoacrylate (MW 454) $CH_3O-(CH_2CH_2O)_n-C(O)CH=CH_2$ | Sigma-Aldrich |

Test Method:

Dynamic Contact Angle Measurement

A test solution, emulsion, or suspension (typically at about 3% solids) was applied to nylon 66 film (available from DuPont) by dip-coating strips of the film. Prior to coating the film was cleaned with methyl alcohol. Using a small binder clip to hold one end of the nylon film, the strip was immersed in the treating solution, and then withdrawn slowly and smoothly from the solution. The coated strip was allowed to air dry in a protected location for a minimum of 30 minutes and then was cured for 10 minutes at 150° C.

Advancing and receding contact angles on the coated film were measured using a CAHN Dynamic Contact Angle Analyzer, Model DCA 322 (a Wilhelmy balance apparatus equipped with a computer for control and data processing, commercially available from ATI, Madison, Wis.). Water and hexadecane were used as probe liquids. Values for both water and hexadecane are reported.

Preparation of $C_4F_9SO_2N(CH_3)CH_2CH_2OH$ (MeFBSE)

MeFBSE was prepared by essentially following the procedure described in U.S. Pat. No. 6,664,354 (Savu et al.), Example 2, Part A.

Preparation of $C_4F_9SO_2N(CH_3)C_2H_4OC(O)NHC_6H_4CH_2C_6H_4NCO$ (MeFBSE-MDI)

A one liter, three-necked round bottom flask, fitted with a heater, nitrogen inlet, reflux condenser and thermocouple was charged with MeFBSE (357.0 g; 1.0 mole) and MEK (600 mL) and heated to reflux, while distilling out 30 mL of MEK. The mixture was then cooled to 30° C. and treated with MDI (750 g; 3.0 mole). The temperature of the mixture was then increased to about 40° C. for 4 hours, filtered and added to 4 liters of toluene. The resulting off white precipitate was collected by filtration, and re-crystallized from toluene (white solid; 689.4 g; 57% yield). Structure was confirmed using liquid chromatography/mass spectroscopy (LC/MS) and LC/UV analysis.

Preparation of C$_4$F$_9$SO$_2$N(CH$_3$)C$_2$H$_4$OC(O)NHC$_6$H$_4$CH$_2$C$_6$H$_4$NHCOOCH$_2$CH$_2$OC(O)CH=CH$_2$ (MeFBSE-MDI-HEA or C4MH)

A one liter flask containing 500 ml ethyl acetate was heated to reflux under N$_2$, and 100 mL of ethyl acetate (EtOAc) was distilled out. The remaining solvent was cooled under dry air and treated with 151.9 g MeFBSE-MDI, 29.1 g 2-hydroxyethyl acrylate, 2 drops DBTDL, and 7 mg phenothiazine. After 5 hr at 50° C., infrared spectroscopy indicated complete conversion of the isocyanate. The cloudy solution was filtered through 40 g diatomaceous earth and rinsed with hot ethyl acetate to give 473.5 g clear solution, (29.6% solids, yield as MeFBSE-MDI-HEA, 77%).

Preparation of C$_4$F$_9$SO$_2$N(CH$_3$)CH$_2$CH$_2$OC(O)CH=CH$_2$ (MeFBSEA)

MeFBSEA was prepared by essentially following the procedure described in U.S. Pat. No. 6,664,354 (Savu et al.) Example 2, Part A & B.

Preparation of PEGDS-1048

A 250 ml three necked round-bottom flask was charged 30 g PEG-900 (MW=900, 33.33 mmol), 6.13 g mercaptoacetic acid (MW=92, 66.66 mmol), 150 g toluene, and three drops CF$_3$SO$_3$H. The mixture was heated to reflux with mechanical stirring under N$_2$. Water formed as a byproduct was captured by an azeotropic condensation trap. The mixture was allowed to reflux for 6 hours, and 1.20 g water was isolated. Toluene was removed by roto-evaporation and 32.56 g or product was recovered.

Preparation of PEGDS-1598

A 250 ml three necked round-bottom flask was charged with melted Carbowax-1450 45.4 g (MW=1450, 31.31 mmol), 5.76 g mercaptoacetic acid (MW=92, 62.62 mmol), 150 g toluene, and three drops CF$_3$SO$_3$H. The mixture was heated to reflux with mechanical stirring under N$_2$. Water formed as a byproduct was captured by an azeotropic condensation trap. The mixture was allowed to reflux for 4 hours, and 1.13 g water was isolated. Toluene was removed by roto-evaporation 51.46 g of product was recovered.

Preparation of HSCH$_2$C(O)—O—(CH$_2$)$_{10}$—O—C(O)CH$_2$SH (C10DS)

A 250 ml three necked round-bottom flask was charged with 34.86 g melted 1,10-decanediol (MW=174.28, 200 mmol), 36.80 g mercaptoacetic acid (MW=92, 400 mmol), 150 g toluene, and three drops CF$_3$SO$_3$H. The mixture was heated to reflux with mechanical stirring under N$_2$. Water formed as a byproduct was captured by an azeotropic condensation trap. The mixture was allowed to reflux for 8 hours, and ~7.2 g water was isolated. Toluene was removed by roto-evaporation and 65.2 g of product (C10DS) was recovered.

Preparation of C$_4$F$_9$SO$_2$N(CH$_2$CH$_2$OH)$_2$ (FBSEE):

C$_4$F$_9$SO$_2$N(C$_2$H$_4$OH)$_2$, a fluorochemical diol, can be prepared as described in Example 8 of U.S. Pat. No. 3,787,351 (Olson), except that an equimolar amount of C$_4$F$_9$SO$_2$NH$_2$ is substituted for C$_8$F$_{17}$SO$_2$NH$_2$.

Preparation of C$_4$F$_9$SO$_2$N(CH$_2$CH$_2$OC(O)CH$_2$SH)$_2$ (FBSEESS):

A 250 ml three necked round-bottom flask was charged with 23.22 g FBSEE (MW=387, 60 mmol), 11.06 g mercaptoacetic acid (MW=92, 120 mmol), 150 g Toluene, and 0.15 g CH3PhSO3H (catalyst). The mixture was heated to reflux with mechanical stirring under N2. Water formed as a byproduct was captured by azeotropic condensation trap. The mixture was allowed to reflux for 8 hours, and 2.20 g water was isolated. Toluene was removed by roto-evaporation to give 32.5 g product, FBSEESS.

Preparation of HSC$_2$H$_4$NHC(O)-LTM-C(O)NHC$_2$H$_4$SH (LTMDS):

A 150 ml Pyrex tube was charged with 79 g LTMDME (MW=2000, 39.5 mmol) and 6.13 g cyteamine (MW=77, 79 mmol). The tube was flushed with N$_2$ sealed, and the mixture was heated to 120° C. with a magnetic stirring for 6 hours. Infrared analysis confirmed complete conversion to LTMDS.

General Procedure for Polymer Preparation:

For each example and comparative example, a 120 ml bottle was charged with fluorinated monomer, dimercaptan and optionally a third hydrocarbon (meth)acrylate monomer in different mole ratios as described in Table 1, 0.5~1% VAZO-67 initiator (by weight), and sufficient solvent to yield a 15-30% solids by weight concentration of monomers. After purging with nitrogen for 35-60 seconds, the bottle was sealed and the mixture polymerized in a 70° C. oil bath for 24 hrs. The advancing and receding contact angles for the resulting polymers were determined as described above and the results were reported in Table 1 below.

Detailed Procedure for Selected Examples and Comparative Example

Example 2

C4MH/PEGDS-1048 (12/1)

A 120 ml bottle was charged with 5.85 g C4MH (MW=723, 8.095 mmol), 0.71 g PEGDS-1048 (MW=1048, 0.672 mmol), 40.34 g ethyl acetate and 0.058 g VAZO-67. A magnetic stir bar was added. The solution was bubbled with nitrogen for two minutes. The sealed bottle was put in a 70° C. oil bath and polymerized with a magnetic stirring for 24 hours. The obtained solution showed precipitation at room temperature. Addition of 5. g DMF turned it clear solution with 12.8% solid. Contact angle data was reported in Table 1 below.

Example 3

C4MH/PEGDS-1048/HEMAPA (2.9/0.3/1)

A 120 ml bottle was charged with 5.03 g C4MH (MW=723, 6.956 mmol), 0.72 g PEGDS-1048 (MW=1048, 0.691 mmol), 0.50 g HEMAPA (MW=210.13, 2.379 mmol), 25.2 g EtOAc and 0.058 g VAZO-67. A magnetic stir bar was added. The solution was bubbled with nitrogen for two minutes. The sealed bottle was put in a 70° C. oil bath and polymerized with a magnetic stirring for 24 hours. The obtained solution showed precipitation at room temperature. Addition of 5. g DMF turned it clear solution with 13.61% solid. Contact angle data was reported in Table 1.

Example 5

C4MH/PEGDS-1598 (12/1)

A 120 ml bottle was charged with 5.0 g C4MH (MW=723, 6.91 mmol), 0.87 g PEGDS-1598 (MW=1524, 0.57 mmol), 35.0 g EtOAc and 0.056 g VAZO-67. A magnetic stir bar was added. The solution was bubbled with nitrogen for two minutes. The sealed bottle was put in a 70° C. oil bath and polymerized with a magnetic stirring for 24 hours. The obtained solution showed precipitation at room temperature. Addition of 5.0 g DMF turned it clear. Contact angle data was reported in Table 1 below.

Example 7

C4MH/EGDS (8.07/1)

A 120 ml bottle was charged with 5.0 g C4MH (MW=723, 6.912 mmol), 0.18 g $(HSCH_2CO_2CH_2)_2$ (MW=210.27, 0.856 mmol), 11.94 g EtOAc and 0.047 g VAZO-67. A magnetic stir bar was added. The solution was bubbled with nitrogen for two minutes. The sealed bottle was put in a 70° C. oil bath and polymerized with a magnetic stirring for 24 hours. The obtained solution showed precipitation at room temperature. Addition of 2.40 g DMSO turned the solution clear with 14.3% solids. Size exclusion chromatography analysis showed the conversion of 94.0%; Mn=6,700; Mw=8,710, Mw/Mn=1.3. Contact angle data was reported in Table 1 below.

Example 9

C4MH/DOODS (5.8/1)

A 120 ml bottle was charged with 3.00 g C4MH (MW=723, 4.154 mmol), 0.13 g $HSC_2H_4OC_2H_4OC_2H_4SH$ (MW=182.31, 0.713 mmol), 17.74 g EtOAc and 0.033 g VAZO-67. A magnetic stir bar was added. The solution was bubbled with nitrogen for two minutes. The sealed bottle was put in a 70° C. oil bath and polymerized with a magnetic stirring for 24 hours. The obtained solution showed precipitation at room temperature. Addition of 5.0 g DMF turned the solution clear at 12% solids. Contact angle data was reported in Table 1 below.

Example 11

C4MH/MeOPEGA/DOODS (11.46/1.8/1)

A 120 ml bottle was charged with 5.0 g C4MH (MW=723, 6.916 mmol), 0.50 g $CH_3O(C_2H_4O)_nC(O)CH=CH_2$ (MW=454, 1.10 mmol), 0.11 g $HSC_2H_4OC_2H_4OC_2H_4SH$ (MW=182.31, 0.603 mmol), 10.53 g EtOAc and 0.055 g VAZO-67. A magnetic stir bar was added. The solution was bubbled with nitrogen for two minutes. The sealed bottle was put in a 70° C. oil bath and polymerized with a magnetic stirring for 24 hours. The obtained solution showed precipitation at room temperature. Addition of 5.0 g DMF cleared the solution at 16.9% solids. Contact angle data was reported in Table 1 below.

Example 13

C4MH/C10DS (8/1)

120 ml bottle was charged with 31.62 g C4MH (36.6% in EtOAc, MW=723, 16 mmol), 0.65 g C10DS (MW=322, 2 mmol), 28.85 g EtOAc and 0.15 g VAZO-67. A magnetic stir bar was added. The solution was bubbled with nitrogen for two minutes. The sealed bottle was put in a 70° C. oil bath and polymerized with a magnetic stirring for 24 hours. The obtained 20% solution showed precipitation at room temperature. Addition of 5.0 g DMF cleared the solution. Contact angle data was reported in Table 1 below.

TABLE 1

Examples 1-18 and Comparative Examples C1-C2

| Example | Formulation | Mole Ratio | Contact Angle (advancing/receding) | |
|---|---|---|---|---|
| | | | Water | Hexadecane |
| 1 | C4MH/PEGDS-1048 | 8/1 | 128/98 | 82/67 |
| 2 | C4MH/PEGDS-1048 | 12/1 | 127/102 | 81/67 |
| C1 | MeFBSEA/PEGDS-1048 | 6/1 | 65/46 | 80/44 |
| C2 | MeFBSEA/PEGDS-1048 | 6/1 | 98/47 | 64/35 |
| 3 | C4MH/PEGDS-1048/HEMAPA | 2.9/0.3/1 | 124/99 | 82/67 |
| 4 | C4MH/PEGDS-1048/HEMAPA | 5.2/0.5/1 | 127/101 | 82/68 |
| 5 | C4MH/PEGDS-1598 | 12/1 | 120/89 | 81/64 |
| 6 | C4MH/EGDS | 4/1 | 132/115 | 80/68 |
| 7 | C4MH/EGDS | 8/1 | 128/103 | 79/68 |
| 8 | C4MH/EGDS | 12/1 | 132/115 | 81/68 |
| 9 | C4MH/DOODS | 5.8/1 | 123/103 | 81/68 |
| 10 | C4MH/DOODS | 10.8/1 | 121/98 | 80/71 |
| 11 | C4MH/MeOPEGA/DOODS | 11/1.8/1 | 121/98 | 80/71 |
| 12 | C4MH/C10DS | 12/1 | 131/108 | 81/66 |
| 13 | C4MH/C10DS | 8/1 | 132/108 | 81/66 |
| C3 | MeFBSEA/C10DS | 12/1 | 122/75 | 75/33 |
| 14 | C4MH/FBSEESS | 4/1 | 121/91 | 82/70 |
| 15 | C4MH/FBSEESS/ODA | 8/1/2 | 120/91 | 81/69 |
| 16 | C4MH/LTMDS | 4/1 | 125/109 | 81/69 |
| 17 | C4MH/LTMDS | 16/1 | 127/106 | 82/68 |
| 18 | C4MH/LTMDS/ODA | 8/1/2 | 128/93 | 81/66 |

Example 19

C4MH/KF-2001 (90/10)

A 120 ml bottle was charged with 4.50 g C4MH (MW=723, 6.22 mmol), 0.49 g KF-2001, 28.4 g EtOAc and 0.056 g VAZO-67. A magnetic stir bar was added, and the solution was bubbled with nitrogen for two minutes. The sealed bottle was put in a 70° C. oil bath and polymerized with a magnetic stirring for 24 hours. The obtained solution was slightly cloudy. Addition of 5 g DMF cleared the solution (13.16% solids). Size exclusion chromatography analysis showed the conversion was 93.4%, Mn=11,600, Mw=21,800 and Mw/Mn=1.9. Contact angle data was reported in Table 2 below.

Example 20

C4MH/KF-2001 (80/20)

A 120 ml bottle was charged with 3.98 g C4MH (MW=723, 5.510 mmol), 1.01 g KF-2001, 27.62 g EtOAc and 0.050 g VAZO-67. A magnetic stir bar was added, and the solution was bubbled with nitrogen for two minutes. The sealed bottle was put in a 70° C. oil bath and polymerized with a magnetic stirring for 24 hours. The obtained solution was slightly cloudy. Addition of 5 g DMF cleared the solution (13.37% solids). Size exclusion chromatography analysis showed the conversion was 87.4%, Mn=12,500, Mw=23,700 and Mw/Mn=1.9. Contact angle data was reported in Table 2 below.

Example 21

C4MH/KF-2001 (70/30)

A 120 ml bottle was charged with 3.51 g C4MH (MW=723, 4.849 mmol), 1.52 g KF-2001, 26.75 g EtOAc and 0.053 g VAZO-67. A magnetic stir bar was added, and the solution was bubbled with nitrogen for two minutes. The sealed bottle was put in a 70° C. oil bath and polymerized with a magnetic stirring for 24 hours. The obtained solution was slightly cloudy. Addition of 5 g DMF turned the solution clear (13.78% solid). Size exclusion chromatography analysis showed the conversion was 87.7%, Mn=12,300, Mw=24, 900 and Mw/Mn=2. Contact angle data was reported in Table 2 below.

Example 22

C4MH/KF-2001/AA (60/30/10)

A 120 ml bottle was charged with 2.99 g C4MH (MW=723, 4.142 mmol), 1.50 g KF-2001, 0.50 g acrylic acid (AA, MW=–72, 6.944 mmol), 25.76 g EtOAc and 0.055 g VAZO-67. A magnetic stir bar was added, and the solution was bubbled with nitrogen for two minutes. The sealed bottle was put in a 70° C. oil bath and polymerized with a magnetic stirring for 24 hours. The obtained solution was clear (16.40% solids). Size exclusion chromatography analysis showed the conversion was 84.8%, Mn=6,420, Mw=14,600 and Mw/Mn=2.3. Contact angle data was reported in Table 2 below.

TABLE 2

Examples 19-22 and Comparative Example C4

| Example | Formulation | Weight Ratio | Contact Angle (advancing/receding) Water | Hexadecane |
|---|---|---|---|---|
| 19 | C4MH/KF2001 | 90/10 | 121/101 | 69/48 |
| 20 | C4MH/KF2001 | 80/20 | 119/94 | 68/48 |
| 21 | C4MH/KF2001 | 70/30 | 120/93 | 69/45 |
| C4 | MeFBSEA/KF-2001 | 70/30 | 112/77 | 34/32 |
| 22 | C4MH/KF2001/AA | 60/30/10 | 112/87 | 54/37 |

Examples 23-25 and Comparative Example C5

The copolymers of the invention were diluted to 5% solids with toluene. The solution was then coated with a #6 wire wound (Mayer) rod onto a 1.6 mil primed polyester terephthalate film. The coated film was attached to a fiberboard frame and dried for 15 minutes at 65° C.

The test method used to evaluate the release coatings was a modification of the industry standard peel adhesion test used to evaluate pressure sensitive adhesive coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1 (11/75)

2.54 cm by 15.24 cm strips of SCOTCH PERFORMANCE MASKING TAPE 233+ (available from 3M Company, St. Paul, Minn.) were rolled down onto the coated polyester film with a 2.04 kg rubber roller. The laminated samples were then aged 7 days at 22° C. and 50% relative humidity or 16 hours at 65° C. Prior to testing, the heat-aged samples were equilibrated to 22° C. and 50% relative humidity for 24 hours.

Release testing was conducted by mounting the masking tape/coated film laminate to the stage of an Instrumentors, Inc. slip/peel tester (model 3M90) with double coated tape. The force required to remove the masking tape at 180 degrees and 228.6 cm/minute was then measured. Tape re-adhesions were also measured by adhering the freshly peeled masking tape to a clean glass plate and measuring the peel adhesion in normal fashion using the same Instrumentors slip/peel tester indicated above, again peeling at 228.6 cm/min and at a 180 degree peel angle. The results of these peel tests are shown in Table 3

The backside of a strip of SCOTCH PERFORMANCE MASKING TAPE 233+ served as a control sample.

TABLE 3

Examples 23-25 and Comparative Example C5

| | | 7 days 22° C. | | 16 hr at 65° C. | |
|---|---|---|---|---|---|
| Example | Formulation | Peel Force from Release Coating, g/cm | Re-adhesion Peel Force from Glass g/cm | Peel Force from Release Coating, g/cm | Re-adhesion Peel Force from Glass g/cm |
| 23 | C4MH/KF-2001, 80/20 | 36 | 462 | 51 | 364 |
| 24 | C4MH/KF-2001, 70/30 | 19 | 485 | 36 | 430 |
| 25 | C4MH/KF-2001/AA, 60/30/10 | 37 | 433 | 54 | 406 |
| C5 | PERFORMANCE MASKING TAPE 233+ | 220 | 527 | 385 | 422 |

Example 26-28 and Comparative Example C6

The copolymers of the invention were coated and tested according to the methods described above with the exception that SCOTCH MAGIC TAPE 810 (Available from 3M Company) was used in place of SCOTCH PERFORMANCE MASKING TAPE 233+. The backside of a strip of SCOTCH MAGIC TAPE 810 served as a control sample. The results are shown in Table 4 below.

TABLE 4

Examples 26-28 and Comparative Example C6

| | | 7 days 22° C. | | 16 hr at 65° C. | |
| --- | --- | --- | --- | --- | --- |
| Example | Formulation | Peel Force from Release Coating, g/cm | Re-adhesion Peel Force from Glass g/cm | Peel Force from Release Coating, g/cm | Re-adhesion Peel Force from Glass g/cm |
| 26 | C4MH/KF-2001, 80/20 | 95 | 147 | 88 | 115 |
| 27 | C4MH/KF-2001, 70/30 | 79 | 141 | 81 | 95 |
| 28 | C4MH/KF-2001/AA, 60/30/10 | 95 | 236 | 78 | 177 |
| C6 | SCOTCH MAGIC TAPE 810 | 79 | 201 | 166 | 131 |

The referenced descriptions contained in the patents, patent documents, and publications cited herein are incorporated by reference in their entirety as if each were individually incorporated.

Various modifications and alteration to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A copolymer comprising repeating units derived from at least one co-reactant comprising two or more mercapto functional groups, and repeating units derived from a fluoroacrylate comprising the reaction product of:
   (a) at least one fluorochemical alcohol represented by the formula:

$C_4F_9$—X—OH wherein:

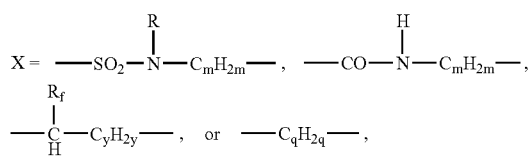

R=hydrogen or an alkyl group of 1 to 4 carbon atoms,
   m=2 to 8,
   $R_f = C_nF_{2n+1}$,
   n=1 to 5,
   y=0 to 6, and
   q=1 to 8;
   (b) at least one unbranched symmetric diisocyanate; and
   (c) at least one hydroxy-terminated alkyl(meth)acrylate or 2-fluoroacrylate monomer having 2 to about 30 carbon atoms in its alkylene portion.

2. The copolymer of claim 1 wherein X is

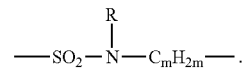

3. The copolymer of claim 1 wherein the fluorochemical alcohol is $C_4F_9SO_2NCH_3(CH_2)_2OH$.

4. The copolymer of claim 1 wherein the unbranched symmetric diisocyanate is 4,4'-diphenylmethane diisocyanate.

5. The copolymer of claim 1 wherein the hydroxy-terminated alkyl(meth)acrylate or 2-fluoroacrylate monomer is 2-hydroxyethyl acrylate.

6. The copolymer of claim 1 wherein the co-reactant is represented by the formula:

$(B)_n(Q-SH)_k$ wherein:
   B=a multivalent segment selected from the group consisting of

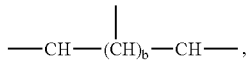

—$(CH_2)_b$—, —$(CH_2CH_2O)_b$—, —$(CHCH_3CH_2O)_b$—,
   [—$(CH_2CH_2O)_b$—]—$(CH_2CH_2O)_b$—, —$(CHCH_3CH_2O)_b$
   —$(CHCH_3CH_2O)_b$—, —$C_4H_8(OC_4H_8)_b$—,
   [—$C_2H_4OC_2H_4OC_2H_4$—]—$C_2H_4OC_2H_4OC_2H_4$—,
   —$C_6H_5CR''_2C_6H_5$—, and [—$(C_2H_4O)_bC_6H_5CR''_2C_6H_5$
   $(OC_2H_4)_b$—]—$(C_2H_4O)_bC_6H_5CR''_2C_6H_5(OC_2H_4)_b$—;
   b=1 to 100;
   R''=$CH_3$, $CF_3$, or H;
   Q=—$(CH_2)_b$—, —$C(O)(CH_2)_a$—, or —$OC(O)(CH_2)_a$—;
   a=1 to 10;
   n=1 or greater; and
   k=2 or greater.

7. The copolymer of claim 1 wherein the co-reactant is represented by the formula:

$HS(Q'-(B')_{n-Q'S)_b}H$ wherein:
   B'=a multivalent segment selected from the group consisting of —$(CH_2)_b$—, —$(CH_2CH_2O)_b$—, —$(CHCH_3CH_2O)_b$—, [—$(CH_2CH_2O)_b$—$(CHCH_3CH_2O)_b$]—$(CH_2CH_2O)_b$—$(CHCH_3CH_2O)_b$—, —$C_4H_8(OC_4H_8)_b$—, —$C_2H_4OC_2H_4OC_2H_4$—, —$C_6H_5CR''_2C_6H_5$—, and —$(C_2H_4O)_bC_6H_5CR''_2C_6H_5(OC_2H_4)_b$—;
b=1 to 100;
R''=$CH_3$, $CF_3$, or H;
n=1 or greater; and
Q'=—$OC(O)CH_2CH_2$— or —$C(O)CH_2CH_2$—.

8. The copolymer of claim 1 wherein the co-reactant is represented by the formula:

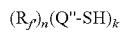

wherein:
$R_f$=a multivalent segment comprising a fluorinated alkyl or alkylene group;
Q''=—$C(O)NH(CH_2)_b$— or —$OC(O)(CH_2)_b$—;
b=2 to 12;
n=1 or greater; and
k=2 or greater.

9. The copolymer of claim 1 wherein the co-reactant is represented by the formula:

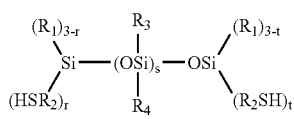

wherein:
$R_1$=monovalent moieties which can independently be the same or different and are selected from the group consisting of alkyl, aryl, alkaryl, alkoxy, alkylamino, hydroxyl, hydrogen, and fluoroalkyl;
$R_2$=divalent linking groups which can independently be the same or different;
$R_3$=monovalent moieties which can independently be the same or different and are selected from the group consisting of alkyl, aryl, alkaryl, alkoxy, alkylamino, hydroxyl, hydrogen, fluoroalkyl, and -ZSH;
$R_4$=monovalent moieties which can independently be the same or different and are selected from the group consisting of alkyl, aryl, alkaryl, alkoxy, alkylamino, hydroxyl, hydrogen, fluoroalkyl, and -ZSH;
wherein:
Z=a divalent linking group;
r=0 to 3;
s=10 or greater; and
t=0 to 3;
wherein at least two of the following are true:
t=at least 1
r=at least 1
$R_3$ comprises at least one -ZSH moiety; and
$R_4$ comprises at least one -ZSH moiety.

10. The copolymer of claim 1 further comprising repeating units derived from at least one comonomer.

11. The copolymer of claim 10 wherein the comonomer is a (meth)acrylate or fluoro(meth)acrylate.

12. A composition comprising a solvent and the copolymer of claim 1.

13. The composition of claim 12 wherein the composition is a release coating composition.

14. An article comprising a substrate having one or more surfaces coated with the composition of claim 12.

15. The article of claim 14 wherein the substrate comprises a material selected from the group consisting of polyethylene terephthalate, polyolefins, and polyolefin coated paper.

16. The article of claim 14 wherein the substrate is a fibrous substrate.

17. The article of claim 14 wherein the substrate is a non-woven substrate.

18. An article comprising a substrate having one or more surfaces coated with the composition of claim 13.

19. The article of claim 18 wherein the article is a release liner.

* * * * *

UNITED STATES PATENT AND TRADEMARK OFFICE
CERTIFICATE OF CORRECTION

PATENT NO. : 7,291,688 B2
APPLICATION NO. : 11/027605
DATED : November 6, 2007
INVENTOR(S) : Zai-Ming Qiu It is certified that error appears in the above-identified patent and that said Letters Patent is hereby corrected as shown below:

<u>Column 5,</u>

Line 24, after " 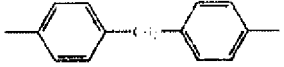 " insert -- . --.

<u>Column 11,</u>
Line 5, delete "ref lux" and insert -- reflux --, therefor.

Line 36, delete "ref lux" and insert -- reflux --, therefor.

<u>Column 13,</u>
Line 59, before "120 ml" insert -- A --.

<u>Column 17,</u>
Line 1, delete "Example" and insert -- Examples --, therefor.

<u>Column 18,</u>
Line 53, in claim 6, delete "Q=—CH$_2$)$_b$—." and insert -- Q = –(CH$_2$)$_b$–, --, therefor.

Line 61, in claim 7, delete "HS(Q'-(B')$_{n\text{-}Q'S)b}$H" and insert -- HS(Q'-(B')$_n$-Q'S)$_b$H --, therefor.

Signed and Sealed this

Twenty-second Day of July, 2008

JON W. DUDAS
*Director of the United States Patent and Trademark Office*